(12) United States Patent
Soller et al.

(10) Patent No.: US 6,223,465 B1
(45) Date of Patent: May 1, 2001

(54) INSECT BAIT-AND-SWITCH LIQUID DELIVERY APPARATUS

(75) Inventors: Douglas A. Soller, Mount Pleasant; Cory J. Nelson, Racine, both of WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/333,135

(22) Filed: Jun. 14, 1999

(51) Int. Cl.[7] ................................................. A01M 1/20
(52) U.S. Cl. ............................................. 43/131; 43/132.1
(58) Field of Search ........................... 43/124, 131, 132.1; 239/44, 51.5, 57

(56) References Cited

U.S. PATENT DOCUMENTS

| | | |
|---|---|---|
| 794,637 * | 7/1905 | Park . |
| 1,056,535 * | 3/1913 | Grimes . |
| 2,176,345 * | 10/1939 | Hurwitt . |
| 2,254,948 * | 9/1941 | Kubalek . |
| 3,324,590 | 6/1967 | Richardson ............... 43/131 |
| 4,160,335 | 7/1979 | Von Kohorn et al. ............... 43/131 |
| 4,247,042 | 1/1981 | Schimanski et al. ............... 239/43 |
| 4,452,393 | 6/1984 | Schimanski et al. ............... 239/57 |
| 4,662,103 | 5/1987 | Cheng ............... 43/131 |
| 4,858,374 | 8/1989 | Clemons ............... 43/122 |
| 5,000,383 * | 3/1991 | van der Heijden ............... 239/47 |
| 5,018,299 | 5/1991 | Peek et al. ............... 43/107 |
| 5,033,229 | 7/1991 | Demarest et al. ............... 43/131 |
| 5,152,992 | 10/1992 | Kandathil et al. ............... 424/405 |
| 5,396,730 | 3/1995 | VanGundy et al. ............... 43/131 |
| 5,406,743 | 4/1995 | McSherry et al. ............... 43/122 |
| 5,501,033 * | 3/1996 | Welfler ............... 43/131 |
| 5,548,922 | 8/1996 | Wefler ............... 43/131 |
| 5,557,880 | 9/1996 | Schneidmiller ............... 43/122 |
| 5,685,109 | 11/1997 | Rimback ............... 43/122 |

* cited by examiner

*Primary Examiner*—Kurt Rowan

(57) ABSTRACT

An insect bait-and-switch liquid delivery apparatus for the control of flying insects, especially wasps. The apparatus includes a container for holding liquid bait, a feed station assembly mounted on the container for making the liquid bait available to an insect, and a cover enclosing the feed station assembly. The feed station assembly includes a tubular core which extends into the interior of the container for supporting a capsule containing liquid active toxic to the insect in an upright orientation so that it floats on the liquid bait. As the liquid bait is depleted due to the feeding action of insects, the capsule moves downwardly until it clears the lower end of the tubular core whereupon it tips and releases the liquid active to admix with the liquid bait. Thereafter, as the insects continue to feed they ingest a mixture of the liquid active and liquid bait. Thus, as the insects travel back and forth from the apparatus to their nest, the active is spread throughout all the insects in the colony resulting in irradication of the entire insect colony.

16 Claims, 4 Drawing Sheets

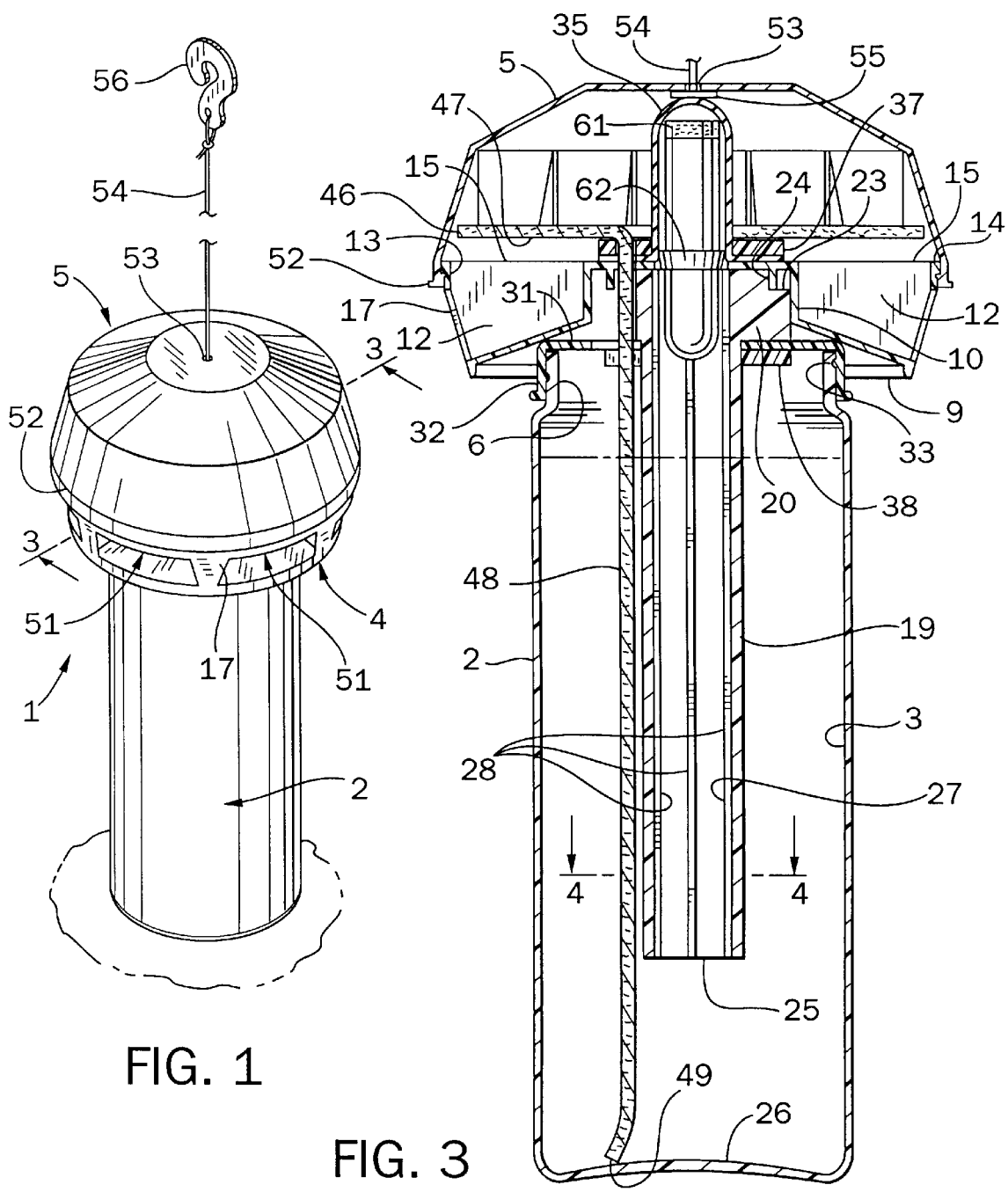
FIG. 1
FIG. 3
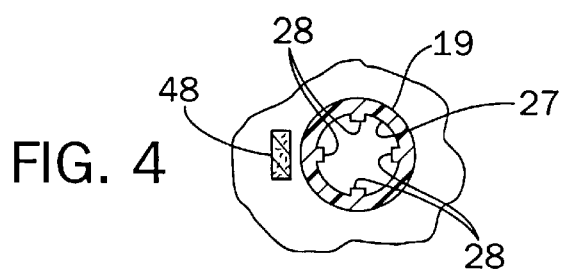
FIG. 4

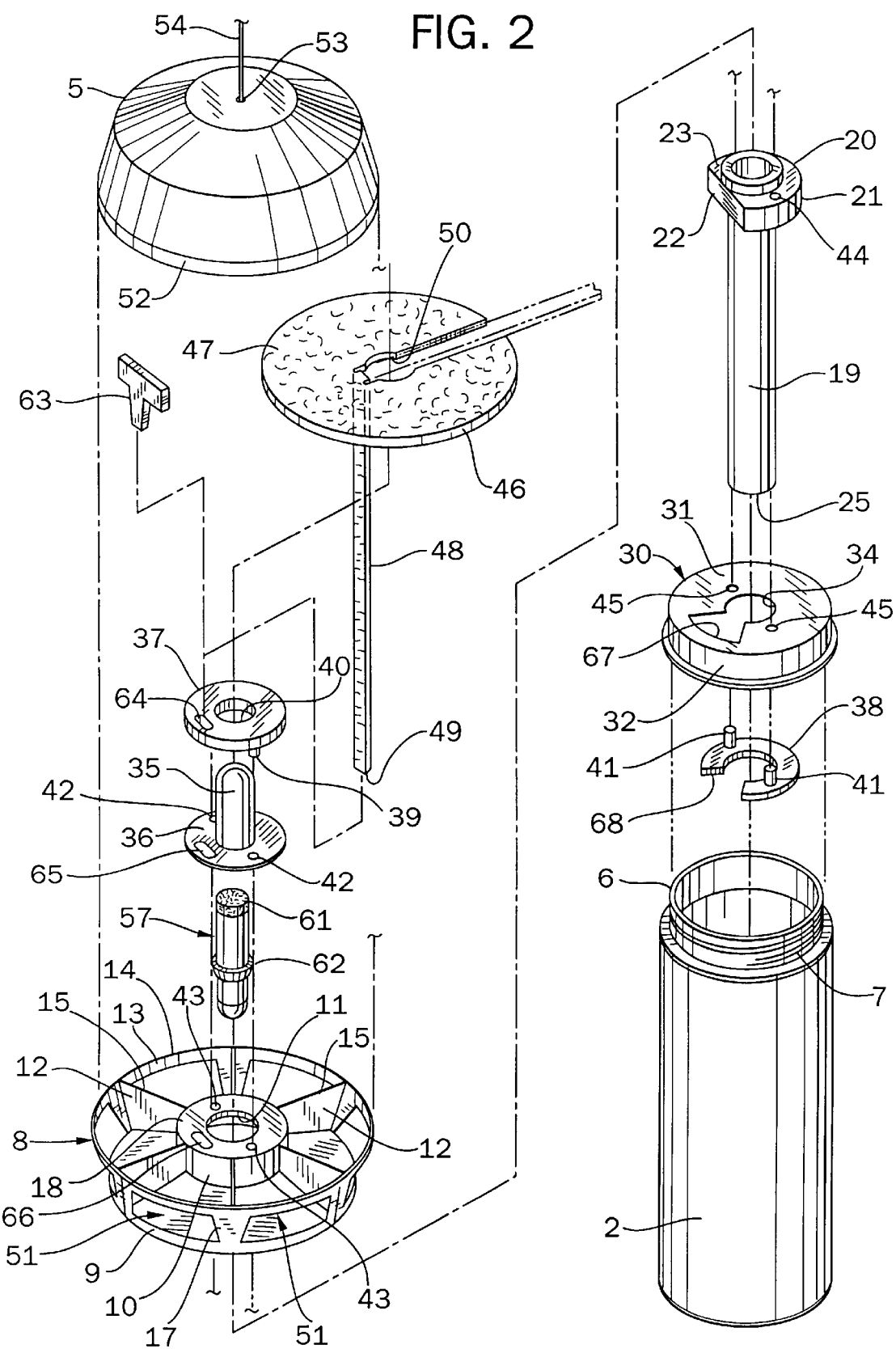

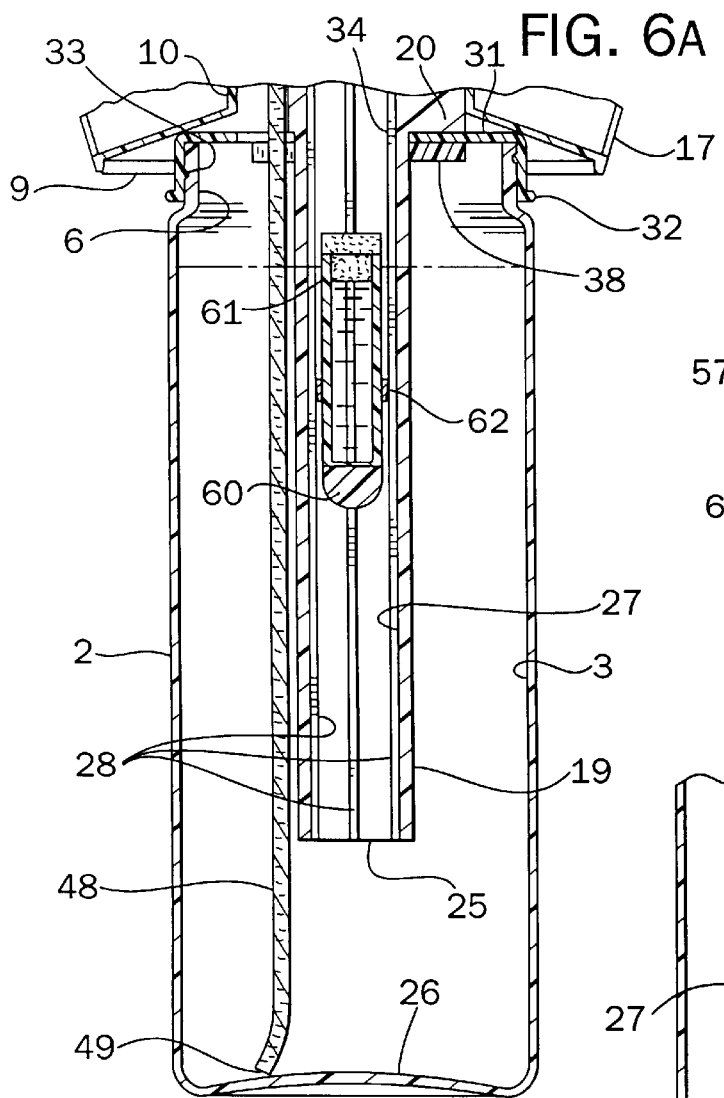
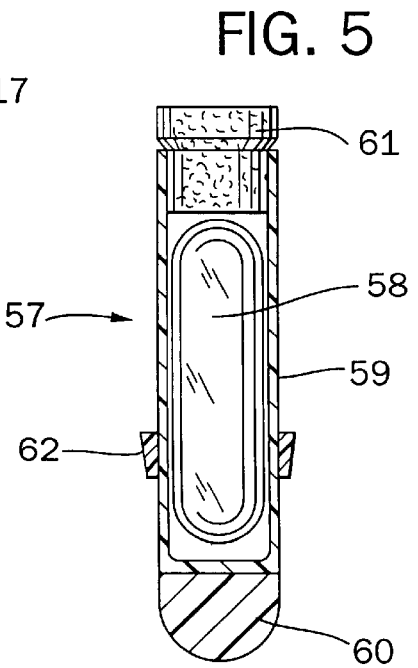
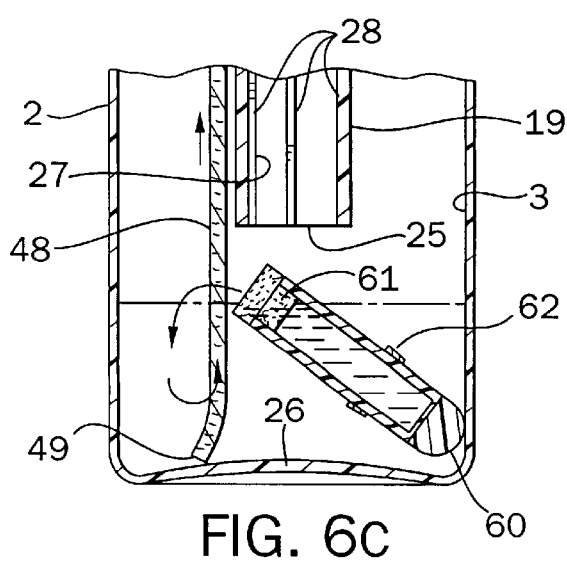
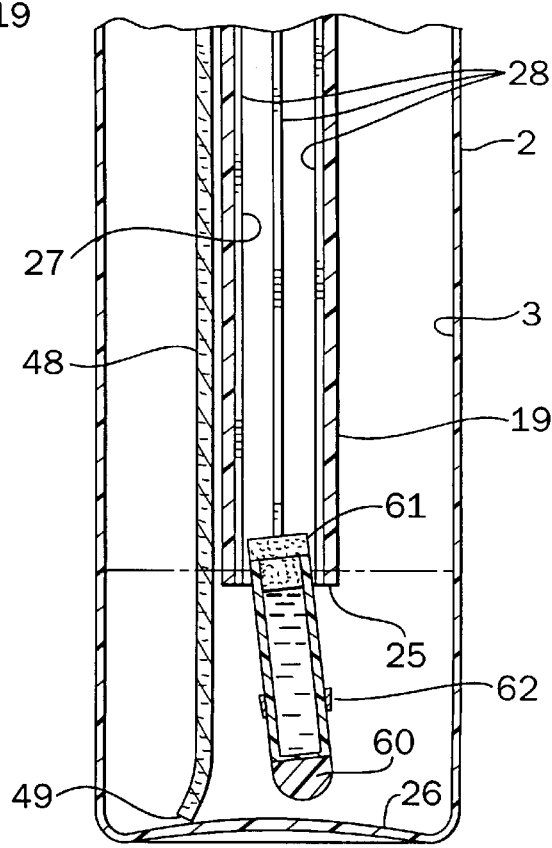
FIG. 6A
FIG. 5
FIG. 6B
FIG. 6C

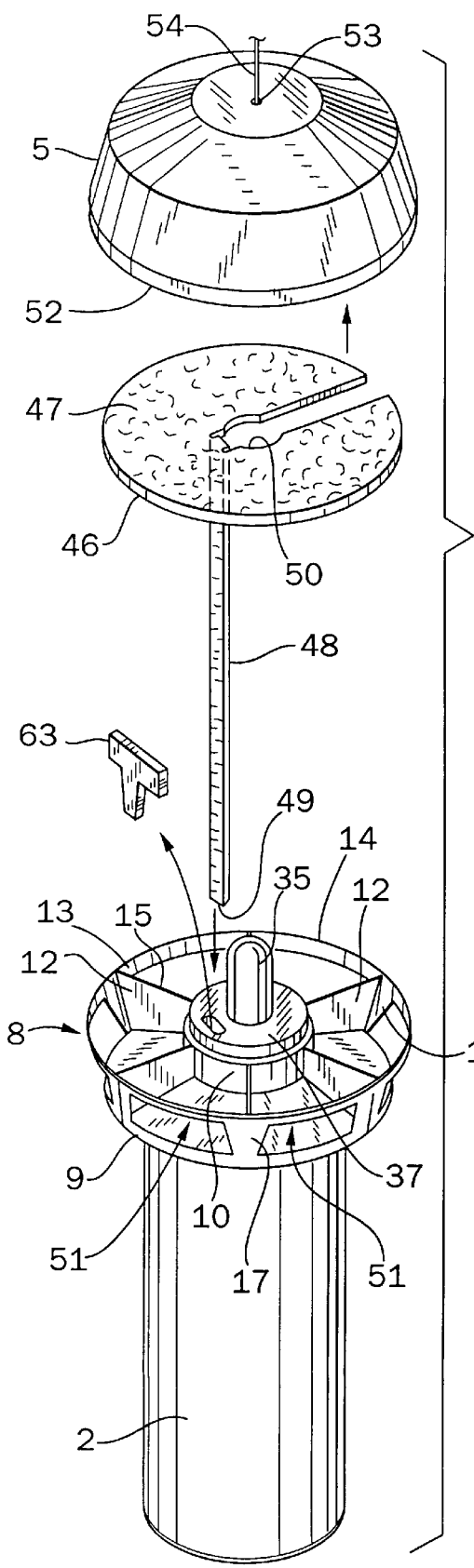
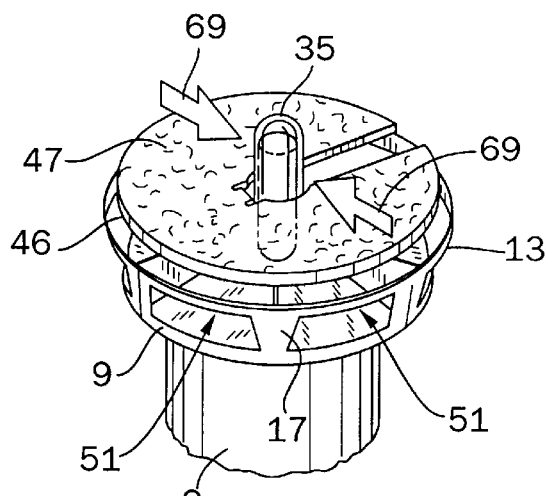
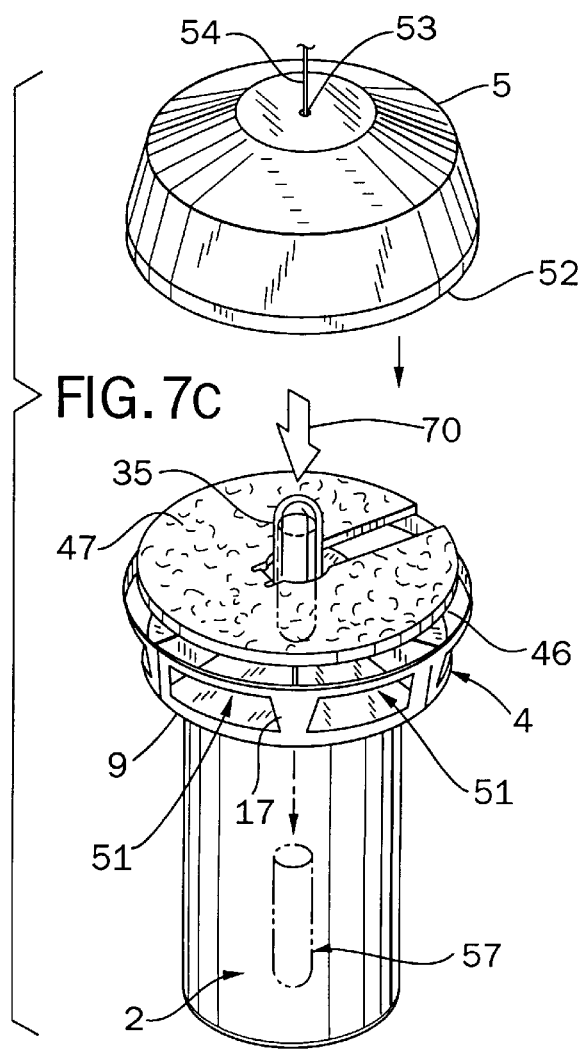

INSECT BAIT-AND-SWITCH LIQUID DELIVERY APPARATUS

BACKGROUND OF THE INVENTION

The present invention relates to the field of insect control, and more particularly to a bait-and-switch liquid delivery apparatus for the control of insects.

Various traps and other types of insecticide delivery systems have been developed in an attempt to control flying insects with varying degrees of success. Insecticide delivery systems are sometimes categorized as being either of the "quick kill" variety or of a "delayed kill" type.

Quick kill systems use pesticides that kill shortly after contact or ingestion. Quick kill pesticides are usually used in aerosol and spray insecticide systems. Unfortunately, quick kill pesticides are typically only effective on individual or very small groups of insects, and thus the entire colony of insects cannot be irradicated unless the entire colony is exposed to the quick kill pesticide. Such exposure can rarely be accomplished due to the limitations of dispensing such pesticides.

Pesticides which have a "delayed kill" action are most useful against social insects such as wasps and bees. If a "delayed kill" pesticide is ingested by wasps and bees, the active substance toxic to the insect will be carried back to the home colony where it will be shared by other members such as larvae, workers, and the queen. If sufficient toxicant is transported back into the home colony, it is possible to irradicate the entire colony. In order to assure that sufficient toxicant is carried back to the nest or home colony, the formulation containing the active toxicant must be palatable to the insect.

Wasps, which include such species as yellow jackets and hornets, are generally categorized as feeding source generalists. However, wasps are quite sensitive to the presence of adulterants in food. Thus, palatable toxicant formulations must be carefully prepared so that the levels of toxicants, surfactants and other substances are carefully blended to provide an attractive bait. However, degradation of the toxicant often times results in bait which, although initially attractive, ultimately becomes unpalatable.

An approach to getting wasps such as yellow jackets and hornets to ingest a toxicant that has been found very effective has been called the "bait-and-switch" technique. This technique essentially allows the wasps to become accustomed to a liquid food source containing no toxicants, i.e. a liquid formulated with bait only which is attractive to the insect during an initial feeding period. As a result, these insects are baited or trained to continue feeding from what they consider to be a palatable formulation even after a toxicant is added to the formulation. For such a method to be convenient and effective, a specialized delivery system needs to be employed.

SUMMARY OF THE INVENTION

The present invention provides an insect bait-and-switch liquid delivery apparatus for the control of flying insects, especially wasps. The apparatus provides an economical and easily manufactured insect bait station that can contain a liquid insect bait and a liquid insect active substance toxic to the insects in such a way as to provide a very effective bait-and-switch apparatus to kill targeted insects. In particular, the apparatus trains wasps to become accustomed to a liquid food source containing no toxicants, i.e. a bait only formulation, so that they subsequently continue feeding from the source after a toxicant is added to the formulation after an initial feeding period. The active ingredient is added automatically to the bait without any further specific positive action by the end user or consumer who purchases the apparatus.

The apparatus has a first reservoir containing a first liquid formulated with a bait attractive to an insect, a feeding station for making liquid from the reservoir available to an insect, a conveying means for conveying liquid from the reservoir to the feeding station, a second reservoir containing a second liquid formulated with an active substance toxic to the insect, the second reservoir floating on the bait-only liquid in the first reservoir, and means sequentially operable to initially prevent admixing of the second toxic liquid with the bait-only liquid during an initial feeding period, but after the initial feeding period, to subsequently enable admixing of the liquid active with the liquid bait to provide a bait-active mixture which is conveyed to the feeding station. In this manner, the insect is initially trained to become accustomed to a liquid food source, and thereafter to continue feeding from the source after a toxicant is added to the formulation. Thus, as the insects travel back and forth from the apparatus to their nest, the active toxin is spread throughout the entire nest to exterminate all members of the nest without the time consuming necessity of actually physically locating the nest or the relatively dangerous activity of directly spraying the nest with a quick kill insecticide.

In order to accomplish the above, the apparatus has three main components. An open top container forms the reservoir for containing the liquid bait, a feed station assembly mounted on the container, and a cover for enclosing the feed station and providing a means for hanging the apparatus in a location known to be frequented by the target insect. The feed station assembly includes a support for an absorbent pad which provides a substantially flat feeding surface, and which is connected to an absorbent wick which extends into the interior of the container so that its free end contacts the liquid within the container. This wick conveys liquid from the first reservoir within the container to the flat feeding surface of the absorbent pad. The feed station assembly also includes a series of access ports allowing the insects to reach and feed from the absorbent feeding pad. The feed assembly also includes a central tubular core which extends from the pad support into the interior of the container and terminates with an open bottom end at a desired spaced distance from the bottom surface of the container.

The second reservoir comprises a capsule containing the liquid formulated to be toxic to the insect. The capsule is comprised of a frangible glass ampoule containing the active liquid contained within a plastic deformable sleeve. The glass ampoule is mounted between a buoyant float at one end of the sleeve and a liquid permeable member at the other end of the sleeve. The capsule is mounted within the central core in an upright orientation so that it floats on the liquid bait in the reservoir with the permeable end of the capsule out of contact with the liquid. As the liquid bait is depleted due to the feeding action of insects on the absorbent pad, the capsule slowly moves downwardly toward the lower end of the central core. Eventually, as the level of the liquid in the container continues to decrease, the capsule clears the lower end of the central core. The float then ensures that the capsule tips sideways enabling the toxin to admix with the liquid bait through the permeable member. Thereafter, as the insects continue to feed, they ingest the liquid active and the liquid bait. Thus, as the insects travel back and forth from the apparatus to their nest, the active is spread throughout all the insects in the colony resulting in irradication of the entire insect colony.

BRIEF DESCRIPTION OF THE SEVERAL VIEWS OF THE DRAWINGS

In the drawings:

FIG. 1 is a perspective view of the bait-and-switch liquid delivery apparatus constructed in accordance with the present invention;

FIG. 2 is an exploded perspective view of the components of the bait-and-switch apparatus of FIG. 1;

FIG. 3 is a cross-sectional view taken along the line 3—3 in FIG. 1;

FIG. 4 is a cross-sectional view taken along the line 4—4 in FIG. 3;

FIG. 5 is an enlarged detailed view of the capsule containing the toxic liquid active;

FIG. 6A is a fragmentary cross-sectional view illustrating the initial set-up stage of the apparatus;

FIG. 6B is a fragmentary cross-sectional view illustrating the capsule about to clear the lower end of the central core;

FIG. 6C is a fragmentary cross-sectional view showing the capsule admixing the toxic liquid active with the liquid bait;

FIG. 7A is an exploded perspective view illustrating the manner of assembling the main components of the apparatus;

FIG. 7B is a fragmentary perspective view illustrating the activation of the apparatus; and FIG. 7C is an exploded perspective view illustrating the final assembly of the components of the apparatus.

DESCRIPTION OF THE PREFERRED EMBODIMENT

Referring now to the drawings, there is illustrated an insect bait-and-switch liquid delivery apparatus for the control of flying insects, preferably wasps such as yellowjackets and hornets. It should be noted, however, that although the specification specifically refers to wasps, the invention is applicable to all types of "social" insects such as ants, termites, wasps, yellowjackets, hornets and bees. Only minor modifications need be made to the basic concept of the present invention to provide an apparatus that is adapted for crawling social insects such as ants and termites rather than the flying social insects in which the present specification is specifically directed. Therefore, the following apparatus may be useful to control all types of insects that can easily assimilate food when it is in a liquid or liquifiable form. Likewise, although a specific liquid bait formulation and specific liquid active formulation may be described herein, these formulations can readily be modified and adapted to a particular target insect. Thus, the apparatus described herein may be useful with a myriad of different liquid formulations.

Referring now to FIGS. 1–3, there is illustrated an insect bait-and-switch liquid delivery apparatus generally designated by the numeral 1 which includes three main components, i.e. an open top container 2 defining an internal chamber or reservoir 3, a feed station assembly generally designated by the number 4, and a cover 5. Referring first to container 2, FIGS. 1–3 illustrate that it is preferably cylindrical in shape having a neck portion 6 at its upper end with external threads 7 integrally formed therein. Container 2 is preferably formed of a semi-transparent plastic material such as high density polyethylene which enables an end user to physically see the level of liquid contained within reservoir 3. As illustrated, the depth of container 2 is substantially greater than its width which advantageously permits ready handling of the apparatus 1 by an end user.

Reservoir 3 initially contains a liquid bait formulated substantially free of any insect-toxic substances and of a composition that is attractive to the target insects. The optimal liquid bait preparation contains 10% to 20% corn syrup, 5% to 15% sucrose, 0.5% to 5% maltodextrine, 1% to 10% of a protein, and 0.001% to 0.20% of a preservative, with the balance of the composition being water. Although this liquid bait composition is preferred, it is clear that other compositions may be utilized, depending on the target insect. For example, liquids may be oils or water and oil emulsions. Food ingredients can include amino acids, vitamins, salts, and trace elements.

Feed assembly 4 is composed of numerous components with one of the primary components being circular shaped housing 8. Housing 8 includes a base 9 integrally formed with a central hub 10 which defines a central opening 11 extending completely through assembly 4. A plurality of upstanding walls or spokes 12 are circumferentially spaced apart from one another and extend radially outwardly from hub 10. A circular ring 13 is mounted at the radially outer end of each spoke 12 such that the upper edge 14 of ring 13 and the upper edges 15 of spokes 12 are flush with one another and are located in a substantially planar relationship to one another to provide a support for an absorbent pad 46 hereinafter to be described. Ring 13 is supported by a plurality of upstanding walls 17 each extending between ring 13 and base 9. Walls 17 provide rigidity and support for both ring 13 and spokes 12. Preferably, housing 8 is molded in one piece from a plastic material to minimize costs. Central hub 10 of assembly 4 also includes an upper wall 18 which, as illustrated best in FIG. 3, is also planar with upper edges 14 and 15 to provide further support for pad 16.

As also shown best in FIGS. 2 and 3, hub 10 receives the upper end of a central tubular-shaped core 19. The upper end of core 19 includes a flange 20 having an outer circumferential surface 21 substantially matching the inner circumferential surface of hub 10. Flange 20 also includes a cutout portion 22, the purpose of which will hereinafter be described. The upper end of core 19 and flange 20 form a step 23 which cooperates with a flange 24 depending from the underside of hub 10 to properly locate core 19 in hub 10 with respect to housing 18. As shown best in FIG. 3, core 19 terminates at a lower end 25 which is spaced a desired distance from bottom wall 26 of container 2. The distance between the lower end 25 and bottom wall 26 must be greater than the length of capsule 57, as will hereinafter be understood.

It should be noted that core 19 has a constant inner diameter defined by inner surface 27 throughout its length. However, referring to FIG. 4, there is illustrated a plurality of ribs 28 extending longitudinally along the entire length of core 19. Ribs 28 also extend radially inwardly from inner surface 27 to provide a means for supporting capsule 57 in its upright orientation and for guiding capsule 57 within core 19 as it moves downwardly therein which will hereinafter be described. Thus, ribs 28 reduce the friction that normally would occur between inner surface 27 and capsule 29 as it travels downwardly through core 19, and tends to prevent capsule 29 from "sticking" to the inner surface 27 of core 19.

Assembly 4 further includes a lid 30 having a top wall 31 and a circular depending flange 32 having internal threads 33 integrally formed therein for threadedly engaging the external threads 7 of container 2. Top wall 31 includes a central opening 34 formed therein which enables core 19 to pass therethrough so that lid 30 can be positioned in engagement with the underside of flange 20, as best shown in FIG. 3. Assembly 4 also includes a deformable plastic bulb 35 which receives capsule 57 therein. Bulb 35 has a closed upper end and an open lower end for receiving capsule 57. A flange 36 projecting radially outwardly from the lower end of bulb 35 is used to mount bulb 35 on housing 8 as will hereinafter be described.

A means for clamping bulb 35, core 19 and lid 30 to housing 18 completes feed assembly 4. The clamping means comprises an upper clamping plate 37 and a lower clamping plate 38 which sandwiches flange 36, upper wall 18, flange 20 and top wall 31 therebetween. In order to accomplish this, plate 37 includes a pair of depending bosses 39 and a central opening 40 for receiving bulb 35. Likewise, lower clamping plate 38 includes a pair of upstanding bosses 41. Bosses 39 extend downwardly through a pair of matching openings 42 in flange 36 of bulb 35 and through a pair of aligned openings 43 in upper wall 18 of hub 10 into a pair of aligned openings 44 in flange 20. Likewise, upstanding bosses 41 extend through aligned openings 45 in top wall 31 of lid 30 and into openings 44 in flange 20. Bosses 39 and 41 are then sonically welded to provide the one piece feed assembly 4.

An absorbent feeding pad 46, preferably made of a cellulose material, is disc-shaped and provides a flat feeding surface 47. In apparatus 1, feeding surface 47 is actually the underside of pad 46. The outer diameter of pad 46 substantially matches the diameter of ring 13 so that housing 8 provides adequate support thereof in a substantially planar manner. Pad 46 includes an integral wick 48 depending therefrom. Wick 48 is composed of the same cellulose material as pad 46. As shown best in FIG. 3, wick 48 has a length which enables it to substantially extend downwardly into container 2 such that its free end 49 bears against bottom wall 26 of container 2. This ensures that the liquid contained within reservoir 3 substantially impregnates wick 48. Thus, liquid from reservoir 3 moves upwardly by capillary action and impregnates the feeding pad 46. Pad 46 also includes a central cutout portion 50 which enables bulb 35 to pass therethrough and permit pad 46 to be supported by housing 8. Thus, housing 8, in combination with pad 46 forms a feeding station for flying insects such as wasps. As shown best in FIG. 1, base 9, spokes 12, ring 13 and upstanding walls 17 form a series of circumferentially spaced access ports 51 which allow insects to reach and feed from the underside surface 47 of absorbent feeding pad 46. As the wasps feed on the liquid impregnated pad 46, wick 48 continuously draws further liquid from reservoir 3 upwardly to replenish what is lost from this feeding as well as evaporation. Thus, as the wasps feed, the level of liquid within reservoir 3 slowly lowers.

The final component of apparatus 1 is cover 5. Cover 5 is dome-shaped and includes a lower cylindrical lip 52 which is formed to snap fit over ring 13 and thereby enclose pad 46. A central opening 53 in the top of cover 5 enables a string, wire, cable or the like 54 to extend therethrough. The lower end of string 54 includes a stop 55 to prevent the string 54 from passing completely through opening 53 while the upper end of string 54 includes a hanger 56 which is used to hang apparatus 1 in a location known to be frequented by wasps, which are the preferred target insects. The dome shape of cover 5 aids in keeping environmental elements such as rain from contacting absorbent pad 16, and its snap fit with ring 13 aids in minimizing evaporation of liquid from pad 16.

Referring now to FIG. 5, there is illustrated a second reservoir generally designated by the numeral 57 containing a liquid formulated with an active substance toxic to the insect, sometimes referred to herein as the "liquid active". The preferred active or toxicant is an effective concentration of a hemisalt preparation of perfluoroalkane sulfonic acid. A sufficient amount of the active is used so that a concentration of 0.001% to 1.5% by weight, preferably 0.02% to 0.03%, by weight of the active is supplied when the active is admixed with the liquid bait, as will hereinafter be described. The hemisalt preparation, being a partially neutralized preparation of perfluoroalkane sulfonic acid, is not very acidic, has sufficient water solubility and produces a toxicant attractant formulation that is very attractive to wasps. The hemisalt preparation is also stable in carbohydrate solutions, the preferred insect attracting ingredient for such insects. The hemisalt of perfluoroalkane sulfonic acids can be made by mixing an aqueous solution of a base with an aqueous solution of the acid to prepare an aqueous formulation having a pH between 2.8 and 6.5, preferably a pH of 4.0 to 6.5, and most preferably a pH of 5.0 to 6.0 with an optimal pH of 5.5. The base used to neutralize the sulfonic acid is selected from the group consisting of hydroxides of sodium, potassium, lithium, calcium, magnesium, zinc, aluminum or zirconium; ammonium hydroxide; primary, secondary, or tertiary amines; primary, secondary or tertiary alkanolamines; or tetra alkylammonium hydroxides, wherein the alkyl is preferably methyl, ethyl, propyl, or butyl. Although the above hemisalt preparation is preferred, other toxicants such as sulfluramid, abamectin, and hydramethylnon may also be utilized.

The active or toxicant is provided within the reservoir or capsule 57, and is contained within a frangible, glass ampoule 58. The ampoule 58, in turn, is contained within a plastic sleeve 59. The sleeve 59 is closed at one end and open at its other end, and contains a float 60 attached at its closed end and a stopper 61 at its open end. Float 60 may comprise any material having a specific gravity less than 1 to ensure that capsule 57 floats in an upright orientation on the bait liquid in reservoir 3, as will hereinafter be described. The float 60 may thus be comprised of any buoyant material, but preferably is composed of a closed cell urethane foam. Stopper 61 is composed of a liquid permeable or porous material and closes the mouth or upper end of sleeve 59. The stopper 61 may be composed of any material which allows release of the liquid active within ampoule 58 into the liquid bait in reservoir 3 when desired, such as cotton or glass wool. A plastic collar 62 surrounds sleeve 59, and as shown best in FIG. 5, collar 62 is slightly tapered from top to bottom. This taper minimizes friction between the external surface of collar 62 and ribs 28 of core 19 so that capsule 57 may readily progress downwardly within core 19 without sticking as the level of liquid bait drops in reservoir 3.

Referring now to FIGS. 7A–7C. There is illustrated the sequential operation for use of the bait-and-switch apparatus 1. When the apparatus 1 is unpackaged, capsule 57 is located within bulb 35, and absorbent pad 46 and wick 48 are initially separate from container 2, feed assembly 4 and cover 5. A tab 63 initially blocks an access hole 64 in upper clamp plate 37. As seen best in FIG. 2, access hole 64 is aligned with a similar hole 65 in flange 36 of bulb 35 which in turn is aligned with another similar hole 66 in top wall 18 of hub 10 as well as cutout portion 22 in flange 20 of core 19. Cutout portion 22 in turn is aligned with a pie-shaped opening 67 in top wall 31 of lid 30 and cutout 68 of lower clamping plate 38. As noted, tab 63 initially blocks access through all of openings 64–68, but when an end user desires to begin using apparatus 1, the end user removes tab 63 and inserts wick 48 down through the aligned openings 64–68 into the liquid bait contained within the liquid reservoir 3 so that the end of wick 48 touches bottom wall 26, and pad 46 is supported on feed assembly 4 to provide the substantially planar feeding surface 47, as best shown in FIG. 3. Thereafter, the end user grasps bulb 35, squeezes it and perhaps bending it slightly to one side, until glass ampoule 48 breaks to release the active into reservoir or capsule 57. This is illustrated by the arrows 69 of FIG. 7B. The end user then pushes directly downwardly on the top end of bulb 35, as illustrated by the arrow 70 in FIG. 7C, forcing capsule 57 downwardly into the upright tube or core 19 wherein capsule 57 floats on the surface of the liquid bait, as best shown in FIG. 6A. Finally, the end user snaps cover 5 in place on ring 13, and then apparatus 1 is hung by means of hanger 56 a location known to be frequented by wasps, such as yellowjackets and/or hornets which are the preferred target insects. After positioning apparatus 1 at the location desired, there is no need for an end user to have any physical contact with the apparatus 1 again, until such time as the end user wishes to remove apparatus 1 to dispose of it.

Referring now to FIGS. 6A–6C, there is illustrated the operation of apparatus 1. FIG. 6A illustrates the initial stage of apparatus 1 as it is hung in position at a desired location. Initially, liquid bait rises through wick 48 wetting pad 46. The feeding surface 47 of pad 46 is thus exposed to wasps for feeding via the access ports 51. As wasps feed on liquid bait, the level of liquid bait drops until eventually the level of liquid bait reaches the open bottom end of core 19, as best shown in FIG. 6B. At this time, capsule 57 will begin to try and tip away from its vertical, upright orientation due to the buoyancy of float 60. Eventually, the level of liquid bait drops sufficiently below the end of core 19 so that capsule 57 escapes from the open lower end of core 19. When this happens, capsule 57 tips to one side and releases the liquid active into the liquid bait, as shown best in FIG. 6C. The liquid active is admixed with the liquid bait through various mechanisms, typically the active of wind causing apparatus 1 to gently swing back and forth until all of the active or toxicant is admixed with the liquid bait. Thereafter, the liquid bait and liquid active combination begins to rise via wick 48 to pad 46. The wasps, having been trained to feed from pad 46 blindly continue to feed from the bait/toxicant formulation at the same location. The wasps, i.e. yellowjackets and hornets will carry the bait-toxicant formulation back to their home colony where it will be shared by larvae, workers, and the queen until sufficient toxicant is transported back into the nest whereby the entire colony is irradicated within a week or two.

We claim:

1. An insect bait-and-switch liquid delivery apparatus for the control of insects, comprising:
   a first reservoir containing a liquid bait formulated with a bait attractive to an insect;
   a feeding station for making liquid from said first reservoir available to an insect;
   conveying means for conveying liquid from said first reservoir to said feeding station;
   a second reservoir containing a liquid active formulated with an active substance toxic to the insect, said second reservoir floating on the liquid bait in said first reservoir; and
   support means for said second reservoir sequentially operable to initially prevent admixing of said liquid active with said liquid bait during an initial feeding period and to subsequently enable admixing of said liquid active with said liquid bait after said initial feeding period to provide a mixture of said bait and active liquids in said first reservoir, said first reservoir includes a bottom wall, said support means comprises a tubular core extending from said feeding station into said first reservoir having an open lower end spaced from said bottom wall, and said second reservoir includes a capsule disposed within said tubular core.

2. The apparatus of claim 1 wherein said capsule has a longitudinal dimension, and said capsule is positioned in its longitudinal upright orientation within said tubular core.

3. The apparatus of claim 2 wherein the lower end of said tubular core is spaced from said bottom wall a distance greater than the longitudinal dimension of said capsule.

4. The apparatus of claim 1 wherein said tubular core includes guide means for guiding said capsule within said tubular core.

5. The apparatus of claim 4 wherein said guide means comprises a plurality of ribs extending longitudinally and radially inwardly along the length of said tubular core.

6. The apparatus of claim 1 wherein said capsule includes opposite ends with a buoyant float at one end thereof.

7. The apparatus of claim 6 wherein said capsule includes a permeable stopper at its other end.

8. The apparatus of claim 7 wherein said capsule includes a frangible ampoule disposed between said buoyant float and said permeable stopper.

9. An insect bait-and-switch liquid delivery apparatus for the control of insects, comprising:
   a container having a bottom wall and defining a first reservoir containing liquid bait formulated with a bait attractive to an insect.;
   a feeding station including a feeding pad for making liquid from said first reservoir available to an insect;
   a wick connecting said pad with the liquid in said first reservoir for conveying liquid from said first reservoir to said pad;
   a tubular core having a lower end opening into said first reservoir beneath an initial level of liquid bait and spaced from said bottom wall;
   a capsule defining a second reservoir containing liquid active formulated with an active substance toxic to the insect, said capsule disposed within said tubular core floating on the liquid bait in said first reservoir so that the liquid active does not mix with the liquid bait until the level of liquid bait in said first reservoir is below the lower end of said tubular core.

10. The apparatus of claim 9 wherein said capsule has a longitudinal length and the lower end of said tubular core is spaced from the bottom wall of said container a distance greater than the length of said capsule.

11. The apparatus of claim 9 wherein said capsule includes opposite ends with a buoyant float at one end thereof to position said capsule in an upright orientation within said core.

12. The apparatus of claim 11 wherein said capsule includes a permeable stopper at the other end, said stopper out of contact with the liquid bait while said capsule is within said core.

13. The apparatus of claim 12 wherein said capsule includes a frangible ampoule disposed between said buoyant float and said permeable stopper.

14. The apparatus of claim 10 wherein said tubular core includes guide means for guiding said capsule within said tubular core in its longitudinal upright orientation.

15. The apparatus of claim 14 wherein said guide means comprises a plurality of ribs extending longitudinally and radially inwardly along the length of said tubular core.

16. An insect bait-and-switch liquid delivery apparatus for the control of insects, comprising:
- a first reservoir containing a liquid bait formulated with a bait attractive to an insect, said first reservoir includes a bottom wall;
- a feeding station for making liquid from said first reservoir available to an insect;
- conveying means for conveying liquid from said first reservoir to said feeding station;
- a second reservoir containing a liquid active formulated with an active substance toxic to the insect, said second reservoir movable in response to the level of liquid bait between an initial non-mixing position wherein said active substance is prevented from admixing with said liquid bait and said liquid bait is at a first filled level, and a mixing position wherein said active substance admixes with said liquid bait and said liquid bait is at a second depleted level; and
- support means for supporting said second reservoir in said first reservoir in such a manner to permit said second reservoir to move between said non-mixing and mixing positions in response to the depletion of the liquid bait in said first reservoir, said support means comprises a tubular core extending from said feeding station into said first reservoir having an open lower end spaced from said bottom wall, and said second reservoir includes a capsule disposed within said tubular core.

* * * * *